UNITED STATES PATENT OFFICE.

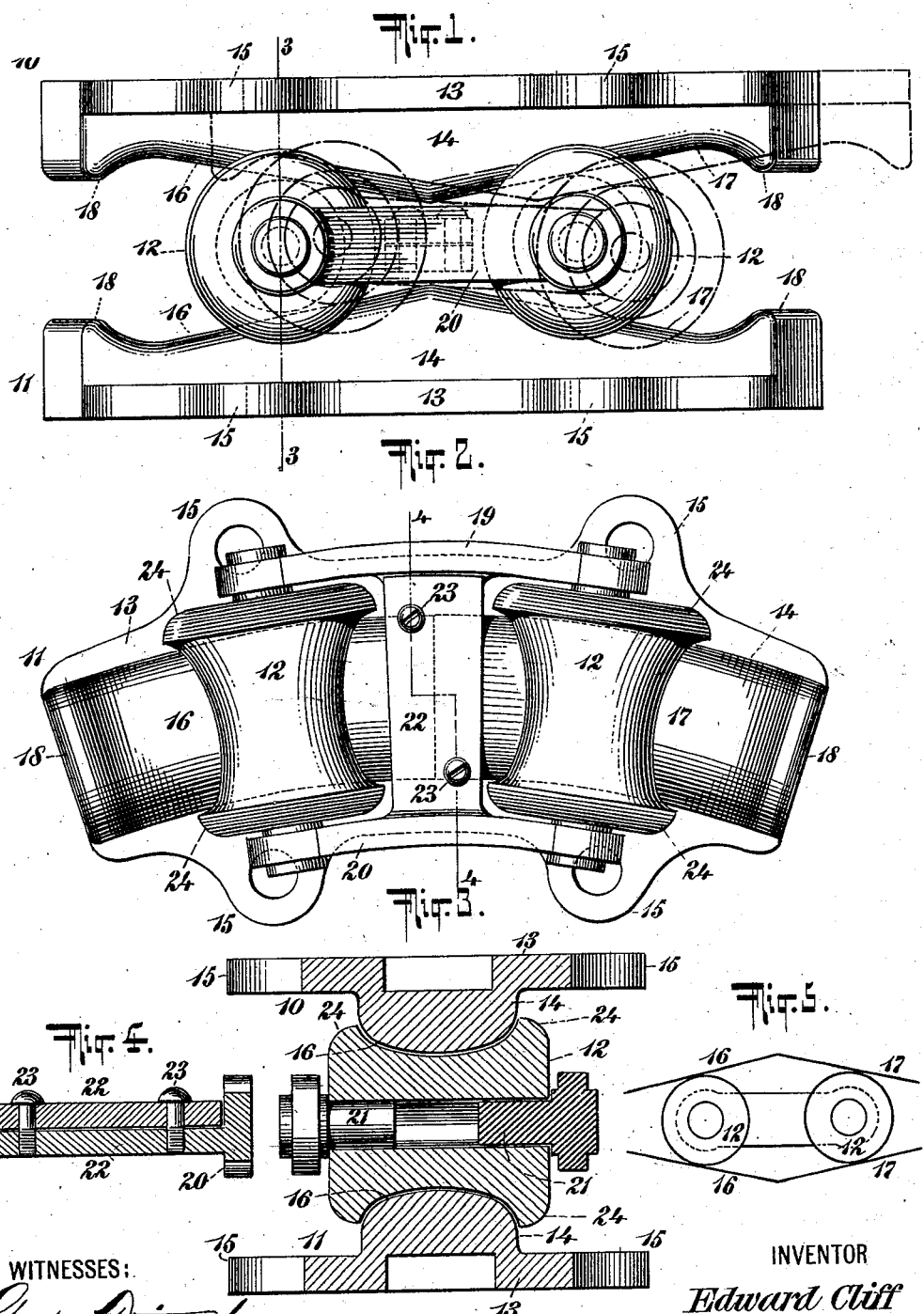

EDWARD CLIFF, OF NEWARK, NEW JERSEY, ASSIGNOR TO VOSE AND CLIFF MANUFACTURING COMPANY, OF NEW YORK, N. Y., A CORPORATION OF NEW YORK.

SIDE AND CENTER BEARING FOR CAR-TRUCKS.

SPECIFICATION forming part of Letters Patent No. 707,208, dated August 19, 1902.

Application filed July 2, 1902. Serial No. 114,038. (No model.)

*To all whom it may concern:*

Be it known that I, EDWARD CLIFF, a citizen of the United States, and a resident of Newark, in the county of Essex and State of New Jersey, have invented certain new and useful Improvements in Side and Center Bearings for Car-Trucks, of which the following is a specification.

The invention relates to improvements in side and center bearings for car-trucks; and it consists in the novel features and combinations of parts hereinafter described, and particularly pointed out in the claims.

My said bearing comprises an upper member, a lower member, and a pair of connected rollers confined between track-sections formed on the facing sides of said upper and lower members, said track-sections presenting oppositely-inclined but otherwise corresponding surfaces at each side of the transverse center of the bearing and said rollers being one at each side of said center and confined between said oppositely-inclined surfaces, so that upon the movement of one of said members upon said rollers there may be no appreciable separation of said members in a direction from each other. The aforesaid rollers are connected together, so that their relation to each other and to said oppositely-inclined track-surfaces may be preserved.

My side bearing may be employed between the ends of the truck and body bolsters or between the ends of a truck-bolster and its end supports when the truck-bolster is mounted to have a limited movement transversely of the truck under the thrusts of the car-body, these being the usual positions for roller-bearings. When the bearing is to be employed between the ends of the truck and body bolsters, it will preferably be given a curved outline on the arc of a circle whose center is the usual king pin or bolt, and when the bearing is to be used below the ends of the truck-bolster it will be of straight form and arranged in line with said bolster, the rollers being transverse of said bolster, the said curved and straight side bearings being customary forms in this art.

The invention will be fully understood from the detailed description hereinafter presented, reference being had to the accompanying drawings, in which—

Figure 1 is a side elevation of a side bearing constructed in accordance with and embodying the invention, the dotted lines showing the position of the parts thereof after the upper member has been moved in one direction. Fig. 2 is a top view of same with the upper member of the bearing omitted. Fig. 3 is a vertical transverse section of same on the dotted line 3 3 of Fig. 1. Fig. 4 is a detached vertical transverse section through the roller-frame on the dotted line 4 4 of Fig. 2, and Fig. 5 is an outline diagram illustrative of a modification of the facing surfaces of the upper and lower members of the bearing.

In the drawings, 10 and 11, respectively, denote the upper and lower members of the bearing, and 12 12 the rollers interposed between said members and disposed at opposite sides of the vertical transverse center thereof.

The upper and lower members 10 11 are each in one integral piece, and said members correspond exactly with each other except as to their position, the upper member facing downward and the lower member facing upward, and each of said members comprises a base-section 13 and a track-section 14, the said base-sections affording means, as the ears 15, for rigidly securing the members in position, and the track-sections 14 furnishing the bearing-surfaces for the rollers 12, said surfaces each being subdivided into two sections 16 17, respectively, which meet at the vertical transverse center of the track-section 14 and thence correspondingly incline in opposite directions from each other, as shown. At the ends of the track-section 14 of each bearing member 10 and 11 are the guards 18 to prevent under all ordinary conditions the escape of either of the rollers 12 from between the bearing members.

The rollers 12 12 are arranged to rotate, but are tied together and maintained at all times at a predetermined distance from each other by means of a roller-frame comprising the sides 19 20, the short pins or axles 21 at the ends of said sides and entering the bore of said rollers 12, and the transverse arms 22, which are fastened together by bolts or screws 23 and serve to connect said sides 19 20 together. One of the arms 22 is integral with the side 19 and the other with the side 20, and said arms 22 when the sides 19 20 are brought into proper relation to each other will come one upon the other, as shown in Fig. 4, in which position they may be securely fastened together by the screws or bolts 23 to maintain the integrity of the roller-frame. The pins or axles 21 are integral with the sides 19 20, and they freely enter the bores of the rollers 12 and permit of the free rotation of said rollers.

The rollers 12 12 have heads or flanges 24 at their ends to extend upon the opposite vertical sides of the track-sections 14, and said rollers 12 12 intermediate said heads or flanges 24 are preferably concaved on their periphery to conform to the surfaces in cross-section of the said track-sections, the latter in cross-section preferably presenting convex surfaces.

When the parts of the side bearing are assembled into operative relation with respect to each other, the facing surfaces of the track-sections 14 are at opposite sides of the transverse center of the bearing oppositely inclined, as shown; but otherwise they correspond with each other, the surfaces 16 16 at one side of said center diverging on corresponding lines toward one end of the bearing and the surfaces 17 17 at the other side of said center diverging on corresponding lines toward the other end of said bearing. The roller-frame normally occupies a central position with respect to the side bearing and locates one of the rollers 12 between the oppositely-inclined surfaces 16 16 and the other roller 12 between the oppositely-inclined surfaces 17 17, and by preference each of said rollers will be normally disposed at about midway of the length of the surfaces between which they perform their duty.

In the employment of the side bearing the upper member 10 thereof will from time to time be forced to travel upon and with the rollers 12 in a direction lengthwise of the lower member 11, and during such movement of said upper member it will ride upon the said rollers 12 and said rollers will ride upon said lower member 11; but owing to the roller-frame said rollers 12 will never leave the respective surfaces 16 16 and 17 17, between which they are initially confined. During the travel of the upper member 10 toward the right, looking at Fig. 1, one roller 12 will move up the inclined track-surface 16 of the lower member 11 and the other roller 12 will move down the inclined surface 17 of said lower member, and at the same time the said upper member 10 will move the inverted apex of its track-surfaces toward the said roller riding down said surface 17 and from the said roller riding up said surface 16, whereby there is maintained a uniform space intermediate the track-surfaces of the members 10 11 at vertical lines extending through the rollers 12, by reason whereof the said upper member 10 while traveling will remain on its horizontal plane and not be compelled to lift the load above it. During the travel of the upper member 10 toward the left, looking at Fig. 1, one roller 12 will move down the surface 16 of the lower member 11 and the other roller 12 will move up the surface 17 of said lower member, and at the same time the said upper member will move the inverted apex of its track-surfaces toward the said roller 12 riding down said surface 16 and from said roller 12 riding up said surface 17, with the result of permitting the said upper member to travel on a horizontal plane.

It is to be observed that one roller 12 is always between the oppositely-inclined surfaces 16 16, and that the other roller 12 is always between the oppositely-inclined surfaces 17 17, and that said rollers are maintained in proper relation to each other and to said surfaces 16 17 by means of the roller-frame connecting them. The fact that the rollers 12 are connected by a frame and that the surfaces 16 16 and 17 17 are oppositely inclined also enables said rollers to readily reach their initial normal position between the members 10 11 upon each movement of the upper member 10 from and back to its normal position.

In the construction presented in Fig. 1 the surfaces 16 16 and 17 17 diverge respectively toward the ends of the side bearings; but all of the results above described may on like principles within the scope of my invention be attained should said surfaces 16 16 and 17 17 be made to converge respectively toward the ends of the bearing, as shown in diagram in Fig. 5, the surfaces 16 16 and 17 17 in either instance being respectively oppositely and correspondingly inclined.

The invention is not in every instance limited to the fact that the surfaces 16 16 and 17 17 are oppositely and equally or correspondingly inclined; but I recommend that the said surfaces be not only oppositely but equally inclined, since with such construction the upper member of the bearing may move on a horizontal line and not be compelled to elevate the load above it. In every instance the said surfaces 16 16 and 17 17 will be oppositely inclined, because very great advantages may be derived from such construction, the disadvantage of not having the said surfaces equally as well as oppositely inclined being that the upper member of the bearing will not under such condition remain on a true horizontal line while traveling.

My invention is applicable also to center bearings for car-trucks, the upper and lower members of the bearing then being circular and having two or more pairs of the oppositely-inclined surfaces 16 16 and 17 17 and two or more pairs of the connected rollers for said surfaces, one pair of said surfaces and one pair of said rollers being at each side of the center of the bearing.

What I claim as my invention, and desire to secure by Letters Patent, is—

1. The bearing comprising upper and lower members having at each side of a vertical transverse line the oppositely-inclined track-surfaces, combined with the rollers located between said surfaces, and means for keeping said rollers a definite distance apart; substantially as set forth.

2. The bearing comprising upper and lower members having at each side of a vertical transverse line the oppositely-inclined track-surfaces diverging toward the outer ends of the bearing, combined with the rollers located between said surfaces, and means for keeping said rollers a definite distance apart; substantially as set forth.

3. The bearing comprising upper and lower members having at each side of a vertical transverse line the oppositely-inclined track-surfaces, combined with the rollers located between said surfaces and having the end flanges extending over the edges of said surfaces, and means for keeping said rollers a definite distance apart; substantially as set forth.

4. The bearing comprising the upper and lower members having at each side of a vertical transverse line the oppositely-inclined track-surfaces, combined with the rollers located between said surfaces, and the roller-frame connecting said rollers and having the axles extending into the bores of said rollers; substantially as set forth.

5. The bearing comprising upper and lower members having at each side of a vertical transverse line the oppositely and equally inclined track-surfaces, combined with the rollers located between said surfaces, and means for keeping said rollers a definite distance apart; substantially as set forth.

Signed at New York, in the county of New York and State of New York, this 1st day of July, A. D. 1902.

EDWARD CLIFF.

Witnesses:
   CHAS. C. GILL,
   ARTHUR MARION.